US009536184B2

(12) United States Patent
Kanematsu

(10) Patent No.: US 9,536,184 B2
(45) Date of Patent: Jan. 3, 2017

(54) PRINTING APPARATUS, SHEET-PROCESSING APPARATUS, CONTROL METHODS THEREOF, STORAGE MEDIUM, AND PRINTING SYSTEM

(71) Applicant: CANON KABUSHIKI KAISHA, Tokyo (JP)

(72) Inventor: Shinichi Kanematsu, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/296,817

(22) Filed: Jun. 5, 2014

(65) Prior Publication Data

US 2014/0368847 A1      Dec. 18, 2014

(30) Foreign Application Priority Data

Jun. 14, 2013   (JP) ................................ 2013-126126

(51) Int. Cl.
*G06F 15/00*       (2006.01)
*G06K 15/00*      (2006.01)
*G03G 15/00*      (2006.01)

(52) U.S. Cl.
CPC ......... *G06K 15/404* (2013.01); *G03G 15/5016* (2013.01); *G03G 15/5091* (2013.01); *G03G 15/6582* (2013.01); *G06K 15/4095* (2013.01)

(58) Field of Classification Search
None
See application file for complete search history.

(56) References Cited

U.S. PATENT DOCUMENTS

| | | | | |
|---|---|---|---|---|
| 2003/0222396 | A1* | 12/2003 | Kurahashi et al. | ........... 271/207 |
| 2007/0285707 | A1* | 12/2007 | Muramatsu | .................. 358/1.15 |
| 2008/0088871 | A1* | 4/2008 | Fukasawa | .................... 358/1.15 |
| 2009/0234497 | A1* | 9/2009 | Uejo | ............................. 700/226 |
| 2009/0303525 | A1* | 12/2009 | Yoshida | ............. G03G 15/5087 |
| | | | | 358/1.15 |
| 2010/0118336 | A1* | 5/2010 | Oshima | ........................ 358/1.15 |
| 2012/0257232 | A1* | 10/2012 | Koike | .......................... 358/1.12 |
| 2012/0272188 | A1* | 10/2012 | Kunitake et al. | ............. 715/811 |
| 2013/0270761 | A1* | 10/2013 | Kimata | ..................... 270/58.08 |
| 2014/0223325 | A1* | 8/2014 | Melendez et al. | ............ 715/744 |
| 2014/0320903 | A1* | 10/2014 | Kyoo | ........................... 358/1.15 |

FOREIGN PATENT DOCUMENTS

JP       2005-206298 A      8/2005

* cited by examiner

*Primary Examiner* — Helen Q Zong
(74) *Attorney, Agent, or Firm* — Fitzpatrick, Cella, Harper & Scinto

(57) ABSTRACT

The present invention is characterized by requesting a user to login if the user has not been authenticated when executing sheet processing on a sheet with a post-processing apparatus without performing printing by a printing apparatus, authenticating the user in accordance with acquired user information, and, when authentication is successful, causing the post-processing apparatus to execute the sheet processing on the sheet, and recording an execution history of the sheet processing by the sheet processing apparatus as an execution history of the authenticated user.

11 Claims, 9 Drawing Sheets

F I G. 11

| RECORD NUMBER | START DATE-TIME | END DATE-TIME | USER ID | TYPE OF FINISHING | NUMBER OF EXECUTIONS |
|---|---|---|---|---|---|
| 1 | 2012/11/15 15:24 | 2012/11/15 15:25 | 2000 | CORNER BINDING | 1 |
| 2 | 2012/11/12 15:24 | 2012/11/12 15:25 | 3000 | DOUBLE BINDING | 3 |
| 3 | 2012/11/1 9:24 | 2012/11/1 9:29 | 2001 | CORNER BINDING | 1 |
| . | . | . | . | . | . |
| . | . | . | . | . | . |
| . | . | . | . | . | . |
| 1000 | 2012/3/3 20:24 | 2012/3/3 15:25 | 2000 | CORNER BINDING | 1 |

PRINTING APPARATUS, SHEET-PROCESSING APPARATUS, CONTROL METHODS THEREOF, STORAGE MEDIUM, AND PRINTING SYSTEM

BACKGROUND OF THE INVENTION

Field of the Invention

The present invention relates to a printing apparatus, a sheet-processing apparatus, control methods thereof, a storage medium, and a printing system.

Description of the Related Art

Conventionally, image forming apparatuses provided with a post-processing apparatus (hereinafter, "finisher") for stapling or the like typically perform sheet processing after the sheets on which images have been formed by the image forming apparatus have been conveyed one at a time to the finisher and stacked in a tray thereof. On the other hand, Japanese Patent Laid-Open No. 2005-206298 proposes an image forming apparatus that performs sheet processing on a bundle of sheets that a user has inserted into a discharging port of the finisher. This function is called off-line sheet processing.

Meanwhile, managing and totaling consumables such as sheets and staples by user or by department is an important function of recent image forming apparatuses that are installed in an office environment. For this reason, it is becoming increasingly common for users to be required to login to use an image forming apparatus and be permitted to use the image forming apparatus after being authenticated.

However, the following problems exist with the above conventional technology. For example, in conventional off-line sheet processing, sheet processing is executed on sheets regardless of whether the user has been authenticated. In the case of executing off-line sheet processing, consumables such as staples may be used depending on the type of sheet processing, and total management of the amount used by user or by department is needed. However, since sheet processing can be performed on a sheet processing apparatus separately, it is not possible to leave a history in the case where the sheet processing apparatus is used without the user logging in.

SUMMARY OF THE INVENTION

The present invention enables realization of a mechanism that is able to reliably leave an execution history of sheet processing that has been executed, even in the case where a user only wants to execute sheet processing without executing printing.

One aspect of the present invention provides a printing apparatus that prints an image on a sheet and is capable of conveying the sheet to a sheet processing apparatus, comprising: an authentication unit configured to execute authentication processing for authenticating a user if the user has not been authenticated, when causing the sheet processing apparatus to execute sheet processing on a sheet without performing printing by the printing apparatus; and a control unit configured to permit the sheet processing by the sheet processing apparatus in a case where the user is authenticated as a result of the authentication processing by the authentication unit.

Another aspect of the present invention provides a sheet processing apparatus for being connected to a printing apparatus that prints an image on a sheet and executing sheet processing on a sheet, comprising: a detection unit provided near a discharging port that discharges sheets from the sheet processing apparatus, and configured to detect that a sheet has been inserted through the discharging port; a request unit configured to request the printing apparatus to perform user authentication, in a case where a sheet is detected by the detection unit; an execution unit configured to execute sheet processing on a sheet when the authentication processing requested by the request unit is successful; and a notification unit configured to notify an execution history of the sheet processing by the execution unit to the printing apparatus as an execution history of an authenticated user.

Still another aspect of the present invention provides a sheet processing apparatus for connecting to a printing apparatus that prints an image on a sheet and executing sheet processing on a sheet, comprising: a detection unit provided near a discharging port that discharges sheets from the sheet processing apparatus, and configured to detect that a sheet has been inserted through the discharging port; a request unit configured to request a user to login if the user has not been authenticated, in a case where a sheet is detected by the detection unit; an authentication unit configured to authenticate the user in accordance with user information acquired in response of the request by the request unit; an execution unit configured to execute sheet processing on a sheet when the authentication processing by the authentication unit is successful; and a recording unit configured to record an execution history of the sheet processing by the execution unit in the printing apparatus as an execution history of a user authenticated by the authentication unit.

Yet still another aspect of the present invention provides a control method of a printing apparatus that prints an image on a sheet and is capable of conveying the sheet to a sheet processing apparatus, comprising: executing authentication processing for authenticating a user if the user has not been authenticated, when causing the sheet processing apparatus to execute sheet processing on a sheet without performing printing by the printing apparatus; and permitting the sheet processing by the sheet processing apparatus in a case where the user is authenticated as a result of the authentication processing.

Still yet another aspect of the present invention provides a non-transitory computer-readable storage medium storing a computer program for causing a computer to execute the steps of the method of controlling the printing apparatus.

Further features of the present invention will be apparent from the following description of exemplary embodiments with reference to the attached drawings.

BRIEF DESCRIPTION OF THE DRAWINGS

FIG. 11 is a diagram showing a data structure of histories resulting from manual finishing processing.

DESCRIPTION OF THE EMBODIMENTS

Figure 1:
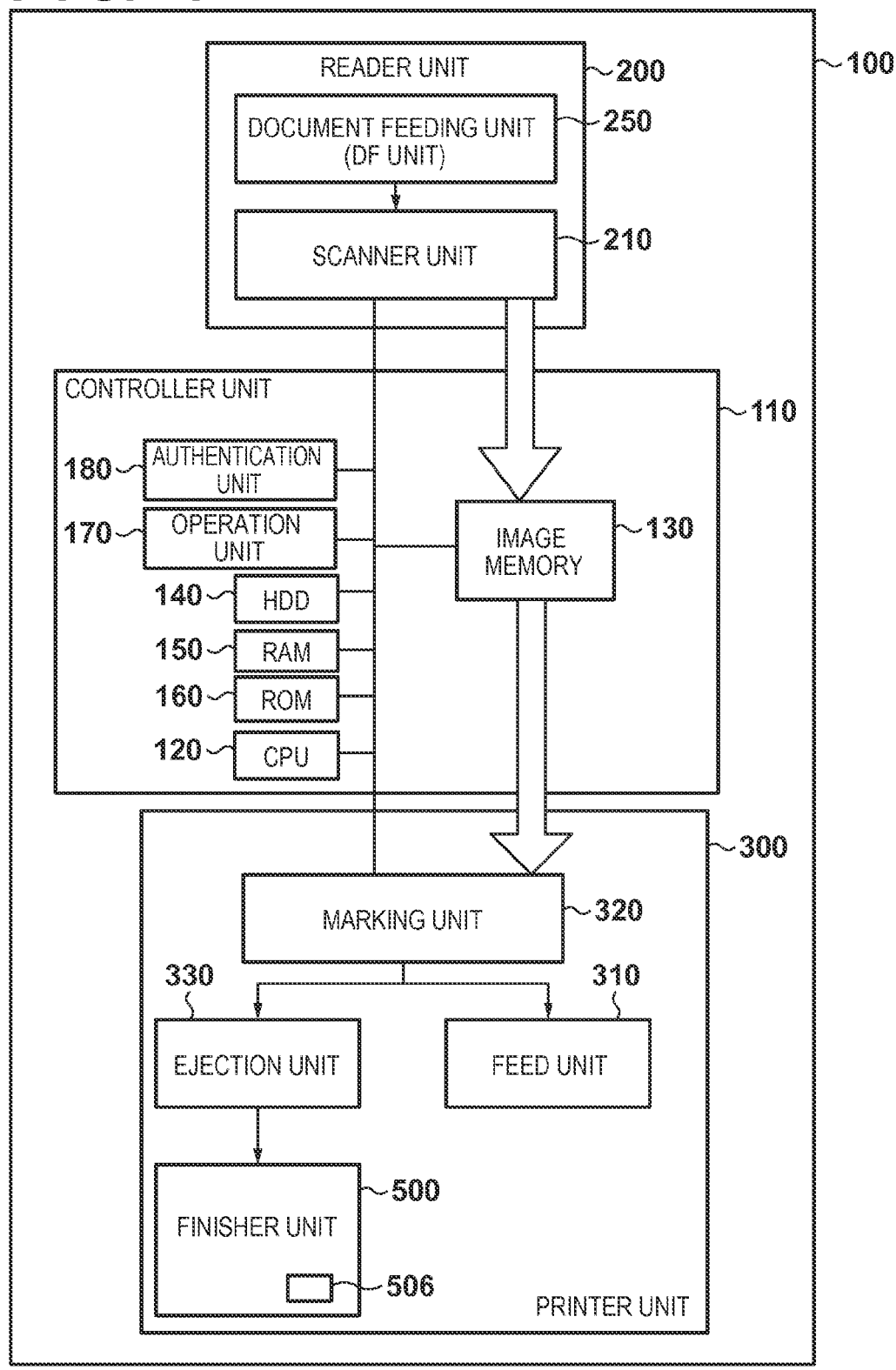
FIG. 1 is a block diagram showing a configuration of an image forming apparatus.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Printing Apparatus

Hereinafter, the first embodiment according to the present invention will be described, with reference to FIGS. 1 to 8 and FIG. 11. First, an exemplary configuration of the image forming apparatus showing an embodiment of the present invention will be described, with reference to FIG. 1. The present embodiment will be described taking an MFP (multifunctional peripheral) as an exemplary image forming apparatus (printing apparatus). However, the present invention is not limited thereto, and is applicable to any image forming apparatus that is connectable to a post-processing apparatus (sheet processing apparatus) after image forming or has a function of executing post-processing (sheet processing).

An image forming apparatus 100 is provided with a controller unit 110, a reader unit 200, and a printer unit 300. The reader unit 200 is an image input apparatus that optically reads an image from a document, converts the image to image data and outputs the image data. The reader unit 200 is constituted by a scanner unit 210 having a function for reading documents, and a document feeding unit (DF unit) 250 having a function for conveying document sheets.

The printer unit 300 is an image output apparatus that conveys sheets, prints image data on the sheets as visible images, and ejects the printed sheets to outside the apparatus. The printer unit 300 is constituted by a feed unit 310 having a plurality of types of sheet cassettes, and a marking unit 320 having a function of transferring and fixing image data to sheets. The printer unit 300 is further constituted by an ejection unit 330 having a function of outputting printed sheets to outside the apparatus, and a finisher unit 500 that performs stapling and sorting. Note that although the image forming apparatus 100 is described here as including the finisher unit 500 serving as a post-processing apparatus, a configuration may be adopted in which the finisher unit 500 is a post-processing apparatus that is independent of the image forming apparatus 100, and is detachable from the image forming apparatus 100. In this case, the present invention is constituted as a printing system, and it is desirable for the post-processing apparatus to be provided with a configuration equivalent to the controller unit 110 of the image forming apparatus 100 discussed later.

The finisher unit 500 is provided with a stapling unit 506 that performs finishing processing (post-processing, sheet processing), such as corner binding, double binding and stapleless binding, on bundles of sheets. The present embodiment will be described taking stapling as an exemplary post-processing, but the present invention is not limited thereto and can be applied as long as the post-processing is operable independently from the processing of the image forming apparatus 100. Independently operable processing refers to post-processing that can be executed on a bundle of sheets that a user has inserted into the finisher unit 500, rather than post-processing performed on sheets that have undergone image forming by the image forming apparatus 100.

The controller unit 110 is constituted by a CPU 120, an image memory 130, an HDD 140, a RAM 150, a ROM 160, and an operation unit 170. The controller unit 110 is electrically connected to the reader unit 200 and the printer unit 300. The CPU 120 in the controller unit 110 provides a copy function by controlling the reader unit 200 to load image data of a document into the image memory 130 and controlling the printer unit 300 to outputs image data in the image memory 130 onto sheets. Furthermore, various adjustment values are stored in the HDD 140, the RAM 150 is used as a work area of the CPU 120, and the ROM 160 stores control programs of the CPU 120. The operation unit 170 has a liquid crystal display unit, a touch panel input apparatus adhered to the liquid crystal display unit, and a plurality of hard keys. Signals input by the touch panel or a hard key are conveyed to the CPU 120, and display of functions, image data and the like during operation of the image forming apparatus is performed on the liquid crystal display unit.

Configuration of Reader Unit and Printer Unit

Figure 2:
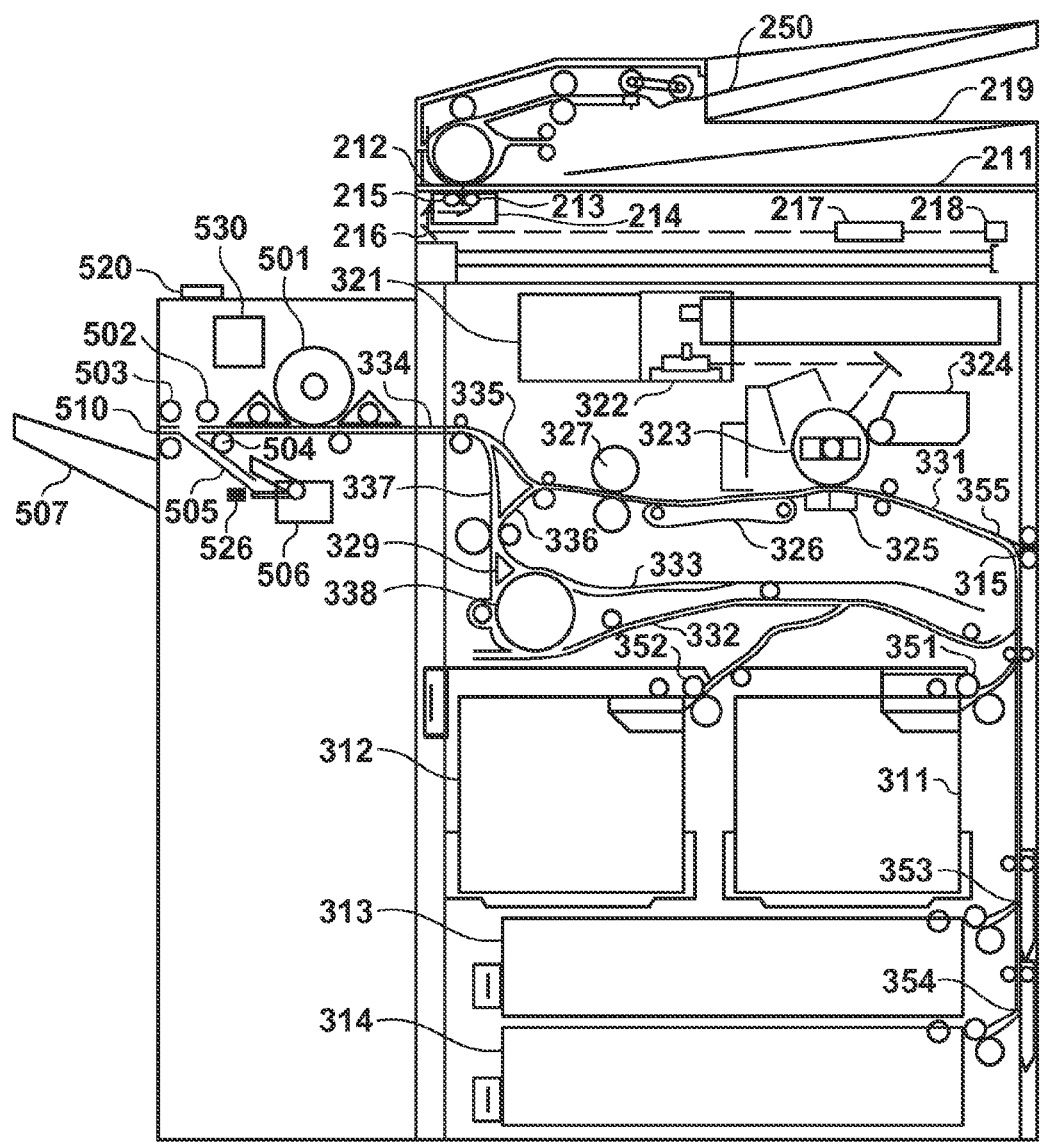
FIG. 2 is a cross-sectional view of a reader unit and a printer unit.

Next, exemplary configurations of the reader unit 200 and the printer unit 300 shown in FIG. 1 will be described, with reference to FIG. 2. First, the reader unit 200 will be described. In the reader unit 200, a document feeding unit (feeder) 250 feeds documents one sheet at a time onto a platen glass 211 in order from the top, and discharges a document that is on the platen glass 211 into a discharge tray 219 after the end of the document reading operation.

When a document is conveyed onto the platen glass 211, a lamp 212 lights up, movement of an optical unit 213 is started, and exposure scanning of the document is performed. Reflected light from the document at this time is guided to a CCD image sensor (hereinafter, "CCD") 218 by mirrors 214, 215 and 216 and a lens 217. In this way, an image of the scanned document is read by the CCD 218. The image data output from the CCD 218 is transferred to the controller unit 110 after undergoing predetermined processing.

Next, the printer unit 300 will be described. In the printer unit 300, reference numeral 321 denotes a laser driver that drives a laser emission unit 322, and causes the laser emission unit 322 to emit laser light corresponding to image data output from the controller unit 110. This laser light is irradiated onto a photosensitive drum 323, and a latent image corresponding to the laser light is formed in the photosensitive drum 323. A developing agent (toner) is adhered to a portion of the latent image on the photosensitive drum 323 by a developer 324.

Also, the printer unit 300 has cassettes 311, 312, 313 and 314 respectively formed like drawers as the feed unit 310. Sheets can be replenished by respectively pulling out the sheet cassettes, replenishing the cassettes with sheets, and shutting the cassettes. The printer unit 300 feeds sheets from one of the cassettes 311, 312, 313 and 314, and conveys the sheets through a conveyance path 331 to a transfer unit 325. Also, the printer unit 300 is capable of conveying sheets to the finisher unit 500.

In the transfer unit 325, the developing agent adhering to the photosensitive drum 323 is transferred to a sheet. The sheet to which the developing agent was transferred is conveyed to a fixing unit 327 by a conveyance belt 326, and the developing agent is fixed to the sheet by the heat and pressure of the fixing unit 327. Thereafter, the sheet that has passed through the fixing unit 327 passes along a conveyance path 335 and a conveyance path 334, and is discharged. Alternatively, in the case where the sheet is discharged after turning the printing surface over, the sheet is guided to a conveyance path 336 and a conveyance path 338, and is thereafter conveyed in the opposite direction, passes along a conveyance path 337 and the conveyance path 334, and is discharged.

Also, in the case where double-sided recording is set, the sheet is guided from the conveyance path 336 to a conveyance path 333 by a flapper 329 after passing through the fixing unit 327, and is thereafter conveyed in the opposite direction and guided to the conveyance path 338 and a re-feeding conveyance path 332 by the flapper 329. The sheet guided to the re-feeding conveyance path 332 passes along the conveyance path 331 at the abovementioned timing, and is fed to the transfer unit 325. Sheets discharged from the conveyance path 334 are conveyed to the finisher unit 500 irrespective of whether single-sided and double-sided recording has been performed.

Sheets conveyed by the finisher unit 500 are first sent to a buffer unit 501. Here, conveyed sheets are buffered by being wrapped around a buffer roller depending on the case. For example, in the case where processing that is performed downstream such as stapling takes time, using this buffer unit enables the conveyance speed of the sheets conveyed from the main unit to be kept constant, which can be helpful in improving throughput. The sheets are then discharged into a discharge tray 507 via a conveyance path by a pair of upstream discharge rollers 502 and a pair of downstream discharge rollers 503.

Also, in the case of stapling mode, the sheet is conveyed by the pair of upstream discharge rollers 502 and immediately after trailing edge of the sheet has passed these rollers, the sheet is pulled back with a knurled belt 504 and discharged into a stack tray 505. Staple processing is performed by a finishing unit 506 after a predetermined number of sheets have been stacked, and the stapled sheets are then discharged into the discharge tray 507 by the pair of downstream discharge rollers 503.

Normal stapling involves sheets discharged from the conveyance path 334 being stapled after being stacked in the stack tray 505. There is a separate manual staple function of stapling a bundle of sheets in the stack tray 505 with the finishing unit 506 when the user inserts a bundle of sheets into a discharging port 510 and the finishing unit 506 detects the bundle of sheets. The manual staple function will be discussed in detail later.

Configuration of Operation Unit

Figure 3:
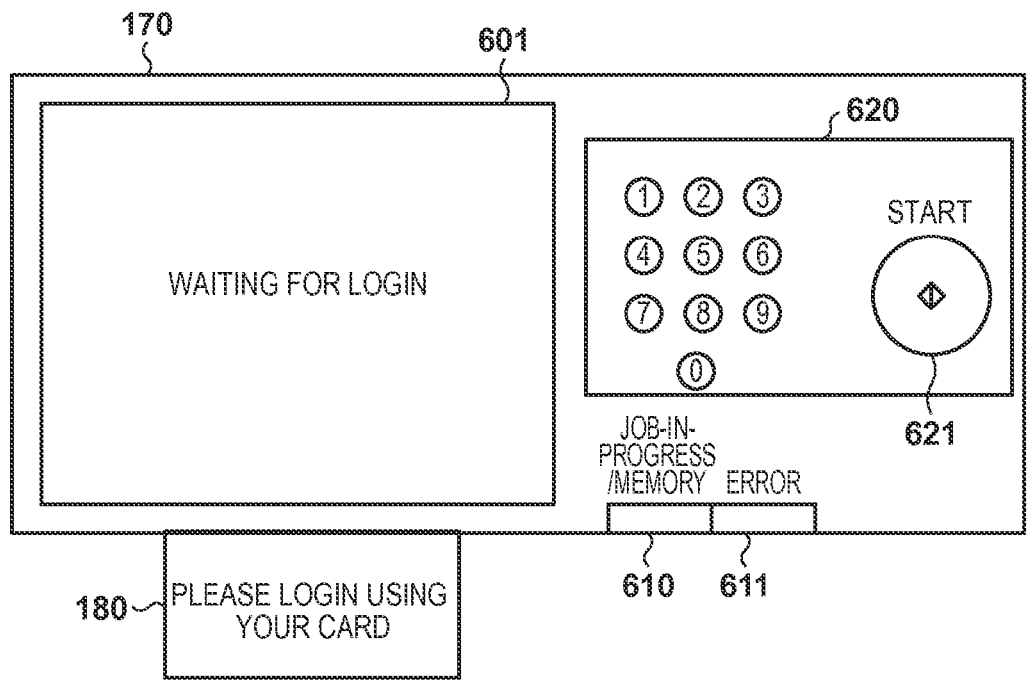
FIG. 3 is a diagram showing an operation unit and a display screen before login.

Next, an exemplary configuration and screen of the operation unit 170 shown in FIG. 1 will be described, with reference to FIGS. 3 and 4. In FIG. 3, reference numeral 601 is a LCD touch panel, and the main mode settings desired by the user and status display are performed here. Also, software keys for performing user input are displayed on the LCD touch panel 601. The operation unit 170 displays a login standby screen shown in FIG. 3 in a user login standby state in which the user has not logged into the image forming apparatus 100. Reference numeral 180 is a user authentication unit provided with a contactless card reading function. Prior to using the image forming apparatus 100, the user first passes his or her ID card over a user authentication apparatus of the user authentication unit 180, and logs in. Here, a method of authenticating information from an ID card is shown, but the present invention is not limited thereto, and ID information input by the user via the operation unit 170 may be authenticated.

Reference numeral 620 is a hardware key unit including a numeric keyboard for the user to input numerical values and a job start key 621. Reference numeral 610 denotes an LED indicating that a job is currently being executed or that an image is currently being recorded to an image memory, and reference numeral 611 denotes an error lamp that indicates that an error has occurred in the image forming apparatus 100, such as a paper jam or an open door. Also, the operation unit 170 is provided with a beep tone generating unit which is not illustrated, and a warning sound is generated in the case of wanting to draw the user attention to an error or the like.

Figure 4:
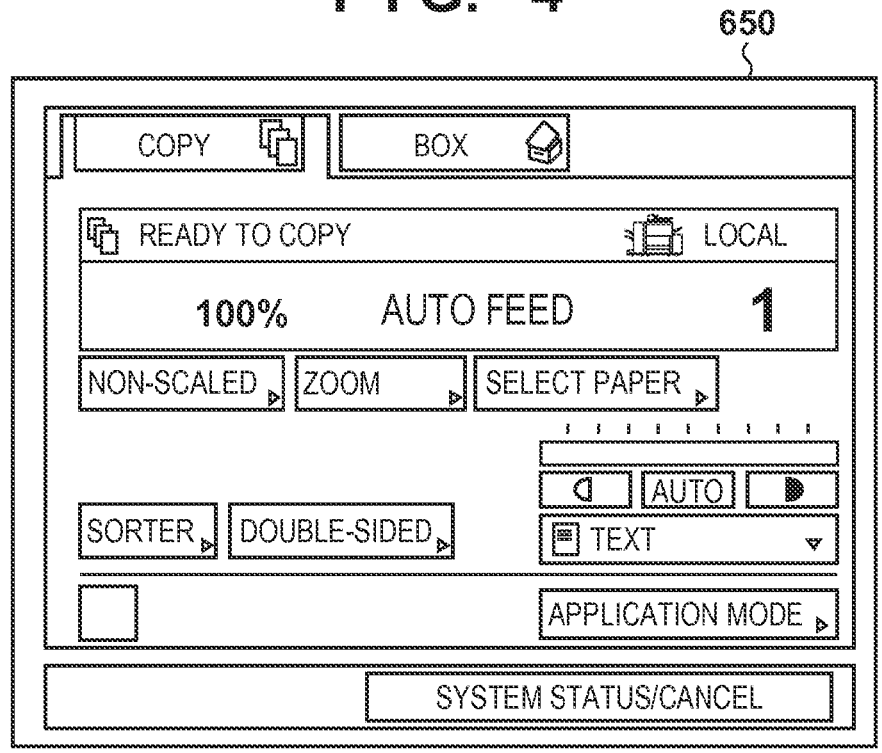
FIG. 4 is a diagram showing the display screen after login.

Reference numeral 650 in FIG. 4 is an exemplary screen display of an LCD touch panel 601 after successfully logging in. The screen 650 is a basic operation screen of the image forming apparatus 100, and the user is able to use the various functions of the image forming apparatus 100 via this screen. These various functions include a copy function of printing documents read by the reader unit 200 with the printer unit 300, and a data transmission function of transmitting documents read by the reader unit 200 to an external apparatus via a network unit which is not illustrated.

Manual Stapling

Figure 5:
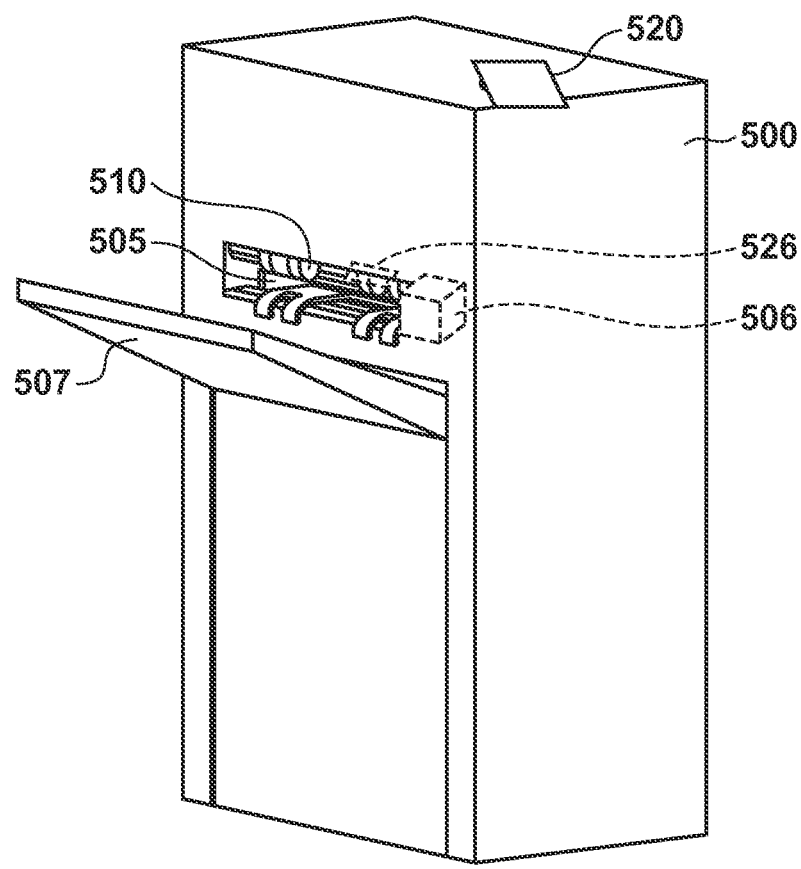
FIG. 5 is a diagram showing a finisher unit.

Next, the procedure of manual stapling will be described with reference to FIGS. 5 and 6. FIG. 5 shows the external appearance of the finisher unit 500 shown in FIG. 1.

First, the user pushes a manual stapling mode button provided on an operation unit 520 of the finisher unit 500. In the case where the image forming apparatus 100 is currently printing, pressing of the manual stapling mode button is disregarded. This is because printed sheets output from the discharging port of the finisher unit will collide with the bundle of sheets to be manually stapled in the case where printing is currently being performed.

On the other hand, in the case of the image forming apparatus 100 is not currently printing, the operational mode of the image forming apparatus 100 transitions to a manual stapling mode, and the user is able to appropriate the finisher unit 500 for use in manual stapling. The user inserts the bundle of sheets that he or she want to staple into the discharging port 510 of the finisher unit 500 which has transitioned to the manual stapling mode. The finisher unit 500 detects that a bundle of sheets has been placed onto the stack tray 505 with a detection sensor 526, and executes stapling on the bundle of sheets on the stack tray 505 with the finishing unit 506.

Figure 6:
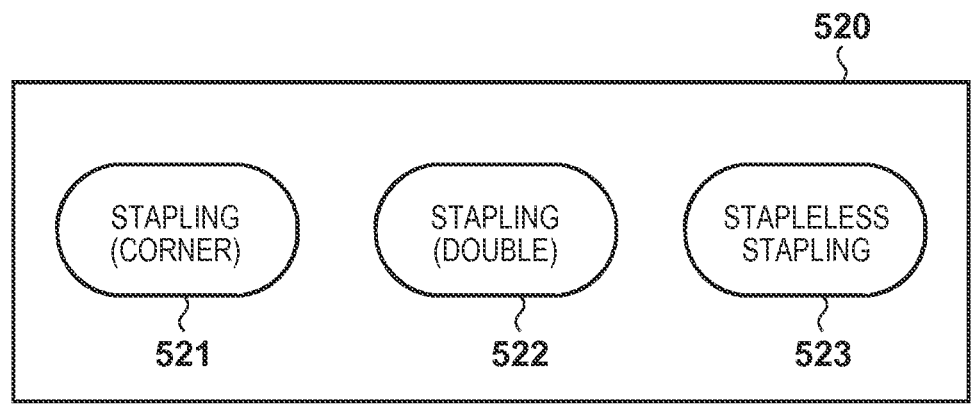
FIG. 6 is a diagram showing an operation unit of the finisher unit.

FIG. 6 shows the operation unit 520 of the finisher unit 500. The finishing unit 506 of the present embodiment is, for example, equipped with three finishing functions displayed on the operation unit 520 of FIG. 6. Reference numeral 521 is a button for selecting and executing corner binding for stapling a bundle of sheets with one staple. Reference numeral 522 is a button for selecting and executing double binding for stapling a bundle of sheets in two places. Reference numeral 523 is a button for selecting and executing a stapleless stapling function for binding a bundle of sheets without using staples by mechanically punching holes in the bundle of sheets and tucking in the punched portion. The user is able to insert a bundle of sheets into the discharging port 510 and execute a staple operation selected by pressing one of the buttons displayed on the operation unit 520.

Processing Procedure

Figure 7:
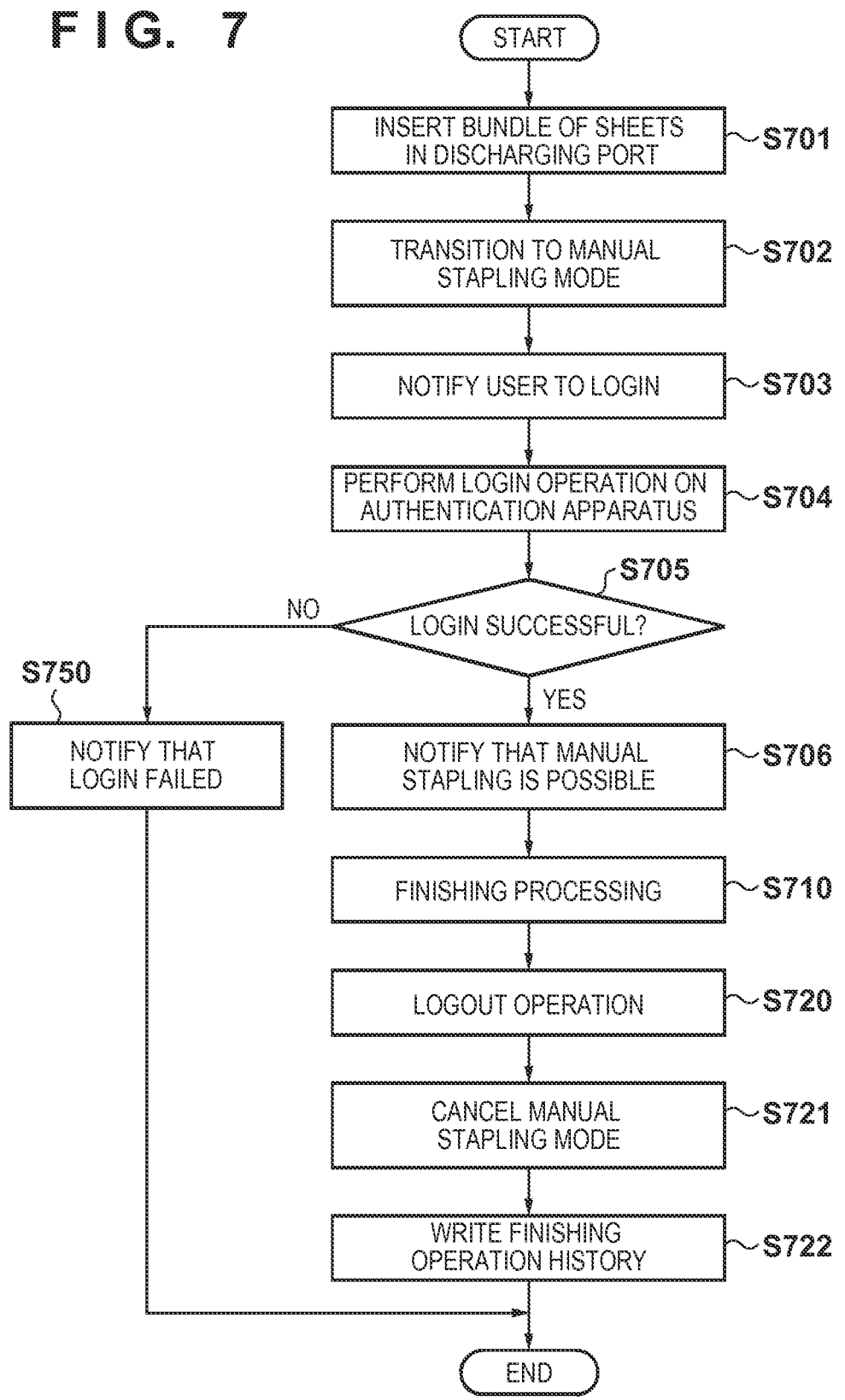
FIG. 7 is a flowchart according to a first embodiment.

Next, the procedure for logging in at the time of manual stapling will be described, with reference to FIG. 7. The processing described hereinafter is realized by the CPU 120 executing a program stored in the ROM 160 and controlling the controller unit 110 and the printer unit 300.

In S701, the CPU 120 detects a bundle of sheets with a detection sensor 526 when the user inserts a bundle of sheets into the discharging port 510. Then, in S702, the finisher unit 500 notifies the controller unit 110 via the printer unit 300 when the detection sensor 526 detects the bundle of sheets. In other words, here, the finisher unit 500 requests the controller unit 110 to execute processing for authenticating the user. The controller unit 110 transitions the finisher unit 500 to the manual stapling mode, having received the notification. Thereafter, in S703, the controller unit 110, having received notification that a bundle of sheets has been detected, determines that the user wants to execute manual stapling, and requests the user to log in. Specifically, the controller unit 110 performs the display denoted by reference numeral 601 in FIG. 3, that is, the display prompting login, on the operation unit 170. Note that display indicating that post-processing cannot be executed if login is not executed may also be performed on the operation unit 520. Also, in order to inform the user that he or she is required to login, an error display lamp 611 is turned on at the same time, a beep tone is generated with a beep tone generating unit which is not illustrated, and the user is prompted to login.

Note that, here, an example in which a login screen is displayed on the operation unit 170 when transitioning to the manual stapling mode will be described. However, a configuration may be adopted in which the processing from S710 which will be discussed later is executed if a user is already logged in, since it is not necessary to display the login screen. In this case, the logout processing of S720 also need not be performed.

Next, in S704, when the user who has been requested to login passes his or her contactless ID card over the authentication unit 180 in response to the request, the controller unit 110 executes user authentication using a user ID (user information) acquired from the ID card. For example, information on users having use authority is registered in advance in the HDD 140, and the controller unit 110 executes user authentication by comparing the registered information with the user ID acquired from the ID card. The controller unit 110 permits user login if information registered in advance as a user having use authority is found, and prohibits user login if such information is not found. Note that, here, an example was described in which the controller unit 110 itself performs user authentication, but the authentication method is not limited thereto. For example, the controller unit 110 may transmit the user ID acquired from the ID card to an external authentication server, and the authentication server may compare the received user ID with user IDs registered in advance in the authentication server and transmit the comparison result to the controller unit 110. The controller unit permits login if the comparison result indicates that the user ID is registered in advance in the authentication server, and prohibits login if the user ID is not registered. Then, in S705, the controller unit 110 determines the authentication result and determines whether login was successful. If login failed, the controller unit 110 advances to S750, performs display on the operation unit 170 indicating that login was unsuccessful, and ends the processing.

On the other hand, if login is successful, the controller unit 110 advances to S706, and the controller unit 110 performs display on the operation unit 170 indicating that manual stapling is possible, and switches off the error display lamp 611. Here, the screen shown in FIG. 6 is displayed on the operation unit 520. In S710, manual stapling is executed, as described above using FIGS. 5 and 6.

After manual stapling has ended, the controller unit 110, in S720, executes an operation for logging out from the image forming apparatus 100 in accordance with a user input. Specifically, upon detecting that a logout button displayed on the operation unit 170 has been pressed by the user, the controller unit 110 executes processing for logging the user out.

Following the logout processing, the controller unit 110, in S721, instructs the finisher unit 500 to cancel the manual stapling mode, and records a manual stapling operation history in the HDD 140 at S722. Specifically, the finisher unit 500 notifies the execution history of post-processing executed while the user was logged in to the controller unit 110, and the controller unit 110 records the notified execution history in the HDD 140. Note that the execution history (history information) recorded here will be discussed in detail later using FIG. 11. When recording of the manual stapling operation history by the controller unit 110 at S722 is completed, manual stapling and the accompanying series of processing operations are ended.

Figure 8:
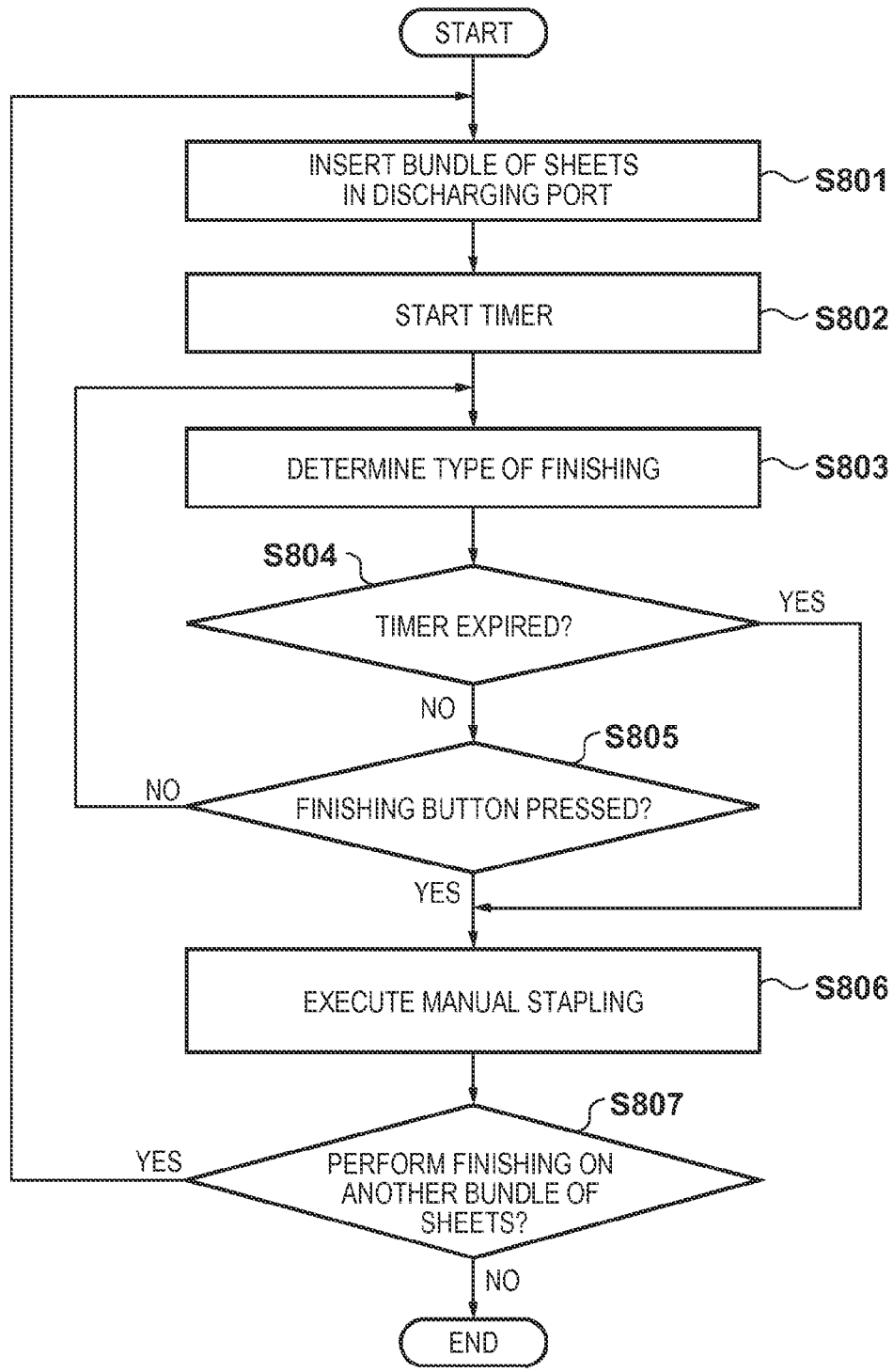
FIG. 8 is a flowchart of manual finishing processing.

Next, the manual stapling processing of S710 will be described in detail, with reference to FIG. 8. The processing described hereinafter is realized by the CPU 120 executing controller firmware stored in the ROM 160 and controlling the controller unit 110 and the printer unit 300.

In S801, the CPU 120 detects a bundle of sheets with the detection sensor 526 provided near the discharging port 510, when the user inserts a bundle of sheets into the discharging port 510. Note that, here, in the case where the bundle of sheets inserted at S701 is left as is, the detection sensor 526 will have already detected the bundle of sheets at the stage at which the processing of S710 is started. When the detection sensor 526 detects a bundle of sheets, a timer until an automatic staple is to be executed is set and started in S802. Then, in S803, when the user presses a stapling button corresponding to desired finishing processing on the operation unit 520, the finisher unit 500 determines the finishing processing corresponding to the selected button, and prepares for stapling.

In S804, the CPU 120 checks the stapling execution period timer, and advances to S806 if the timer has expired, and executes manual stapling. On the other hand, the CPU 120 advances to S805 if the timer has not expired, and determines whether a finishing button has been pressed. If the finishing button has been pressed, manual stapling is executed at S806. On the other hand, if the finishing button has not been pressed, the processing returns to S803 and the finishing processing is determined again.

When manual stapling has been executed, the CPU 120, in S807, determines whether the user wants to further perform manual stapling of another bundle of sheets, and returns to S801 if this is the case, and repeats the above-mentioned processing. On the other hand, when manual stapling has been completed on all bundles of sheets, the processing of 710 is ended. Note that, here, whether the user wants to further perform stapling of another bundle of sheets may be determined based on a related user input, or may be determined based on whether another bundle of sheets has been inserted before a predetermined period of time elapses after the stapling of S806 is completed.

Execution History

Next, the data contents of a manual stapling operation history (execution history) 1101 that is recorded at S722 will be described, with reference to FIG. 11. The manual stapling operation history 1101 includes a record number 1110, a start date-time 1111, an end date-time 1112, a user ID 1113, the type of finishing 1115, and the number of executions 1116.

The record number 1110 shows numbers uniquely allocated to each execution history. The start date-time 1111 shows dates and times at which users logged in to perform manual stapling. The end date-time 1112 shows dates and times at which users logged out. The user ID 1113 shows authenticated user IDs. The finishing type 1115 shows the type of finishing that was executed. Here, the type of finishing executed in manual stapling is recorded, but information showing other post-processing may also be recorded. The number of executions 1116 is the number of times that a finishing operation (e.g., stapling operation) was executed. Since the manual stapling histories are recorded in the HDD 140 together with the user IDs authenticated by the authentication unit 180, it is possible to total the number of staples consumed per user based on this history data.

As described above, the image forming apparatus 100 according to the present embodiment prompts the user to login in the case where post-processing is to be separately executed in the finisher unit 500, without an image forming operation (printing operation) being performed. The image forming apparatus 100 then executes authentication processing and, when authentication is successful, executes post-processing and records an operation history. An operation history can thereby be left even in the case where the finisher unit 500 is used separately. Also, in the present embodiment, since the number of executions is recorded as an operation history, in the case where a stapling operation is performed as post-processing, it is possible to total the number of staples consumed per user.

Note that the present invention is not limited to the above embodiment and various modifications are possible. For example, in the above embodiment, the image forming apparatus 100 controlled execution of post-processing, but a configuration may be adopted in which the finisher unit 500 serving as a post-processing apparatus independently controls execution of post-processing. In this case, the finisher unit 500 requests the image forming apparatus 100 to perform authentication, and executes post-processing when authentication is successful. Furthermore, the post-processing apparatus notifies the execution history of executed post-processing to the image forming apparatus 100, and causes the HDD 140 of the image forming apparatus 100 to record the execution history. Also, a configuration may be adopted in which user authentication is performed using the operation unit 520 of the finisher unit 500, instead of via the operation unit 170 and the authentication unit 180 of the image forming apparatus 100. In this case, the operation unit 520 is desirably provided with an interface for the user to input authentication information.

Second Embodiment

Figure 9:
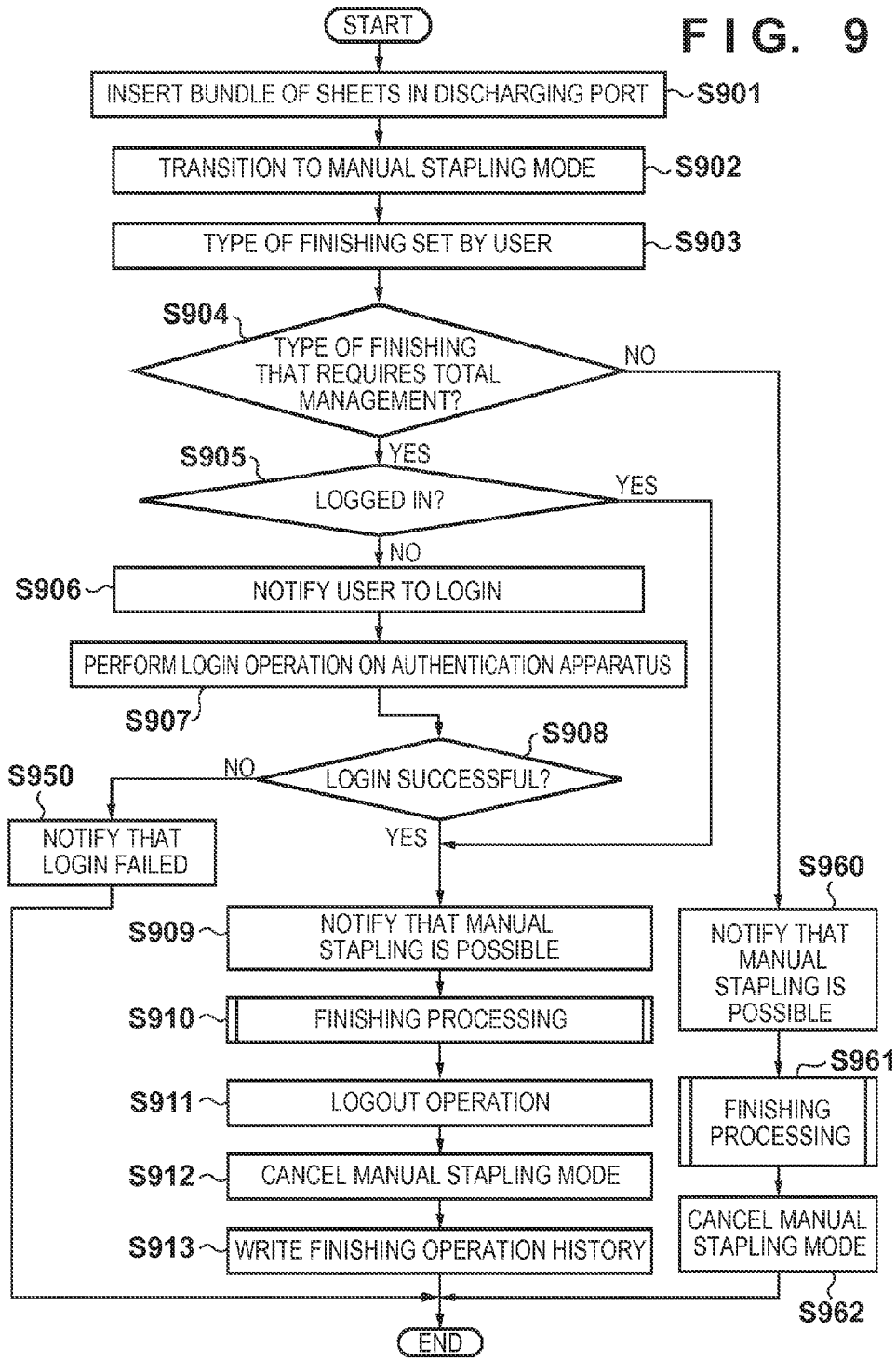
FIG. 9 is a flowchart according to a second embodiment.

Hereinafter, a second embodiment according to the present invention will be described, with reference to FIG. 9. In the present embodiment, management determination as to whether total management (e.g., total management of the consumed staples) is required is performed, according to the function (type) of the finishing processing selected by the user, and, if necessary, login processing is executed and the execution history is recorded. For example, because staples are consumed in stapling that uses staples, the user is prompted to be authenticated, and the post-processing history is recorded as the execution history of the authenticated user. On the other hand, because staples are not consumed in stapling that does not use staples, stapling that does not use staples is executed without prompting the user to be authenticated. This enables the execution history of stapling to be managed in the case of stapling that uses staples, and the time and effort involved in the user performing operations for authentication to be omitted in the case of executing stapling that does not use staples. Here, description will focus on the differences from the above first embodiment. The processing described hereinafter is realized by the CPU 120 executing controller firmware stored in the ROM 160, and controlling the controller unit 110 and the printer unit 300.

In S901 and S902, when a user inserts a bundle of sheets, the finisher unit 500 transitions to the manual stapling mode. Then, in S903, the CPU 120 detects that the user has pressed a stapling button corresponding to desired finishing processing on the operation unit 520. Then, in S904, the controller unit 110, having being notified of the selected type of finishing function by the finisher unit 500, determines whether the selected function requires total management.

In the case where the determination result indicates stapleless binding which does not require total management, the processing advances to S960, and the controller unit 110 performs display on the operation unit 170 indicating that manual stapling is possible, and transitions to the state in which manual stapling is possible, without executing login processing. Then, in S961, the CPU 120 executes a finishing operation in accordance with the user input, cancels the manual stapling mode at S962, and ends the processing.

On the other hand, if the determination result of S904 indicates finishing that requires total management, the processing advances to S905, and the controller unit 110 determines whether the user has already logged in, and, at S909, notifies that manual stapling is possible if the user is already logged in. Note that since the series of processing steps of the manual stapling from S910 to S913 following S909 are the same as S706, S710, S720, S721 and S722 described in the above first embodiment, description thereof is omitted. On the other hand, since the processing procedure of the processing steps from S906 to S908 and S950 following the case where the user is not logged in at S905 is also the same as the processing procedure from S703 to S705 and S750 in the above first embodiment, description thereof is omitted.

As described above, the image forming apparatus 100 according to the present embodiment judges whether total management is required according to the type of finishing processing selected by the user, in the case where post-processing is separately executed in the finisher unit 500 without an image forming operation (printing operation) being performed. The image forming apparatus 100 then, if necessary, prompts the user to login and executes authentication processing, and, when authentication is successful, executes post-processing and records an operation history. An operation history can thereby be left, even in the case where the finisher unit 500 is used separately. Also, in the present embodiment, memory use efficiency can be improved, since the execution history is only recorded for finishing processing that requires total management. Note that, in the present embodiment, an example based on whether stapling that uses staples is selected or whether stapling that does not use staples is selected as exemplary post-processing was described. However, the present invention is not limited thereto. For example, assume that the image forming apparatus 100 has a post-processing function, other than stapling, that is executable without printing an image. Specifically, assume that sheets can be conveyed to the finisher unit 500 and that punching, saddle stitching and center folding can be executed, without printing images on sheets fed from an inserter or a feed cassette. In this case, it is assumed that punching is post-processing that does not require user authentication, since consumables are not used. It is assumed also that saddle stitching is post-processing that requires user authentication since staples are used as consumables, and that center folding is post-processing that does not require user authentication since consumables are not used. Also, a configuration may be adopted in which a user or an administrator is able to set whether user authentication is required for each type of sheet processing.

Third Embodiment

Figure 10:
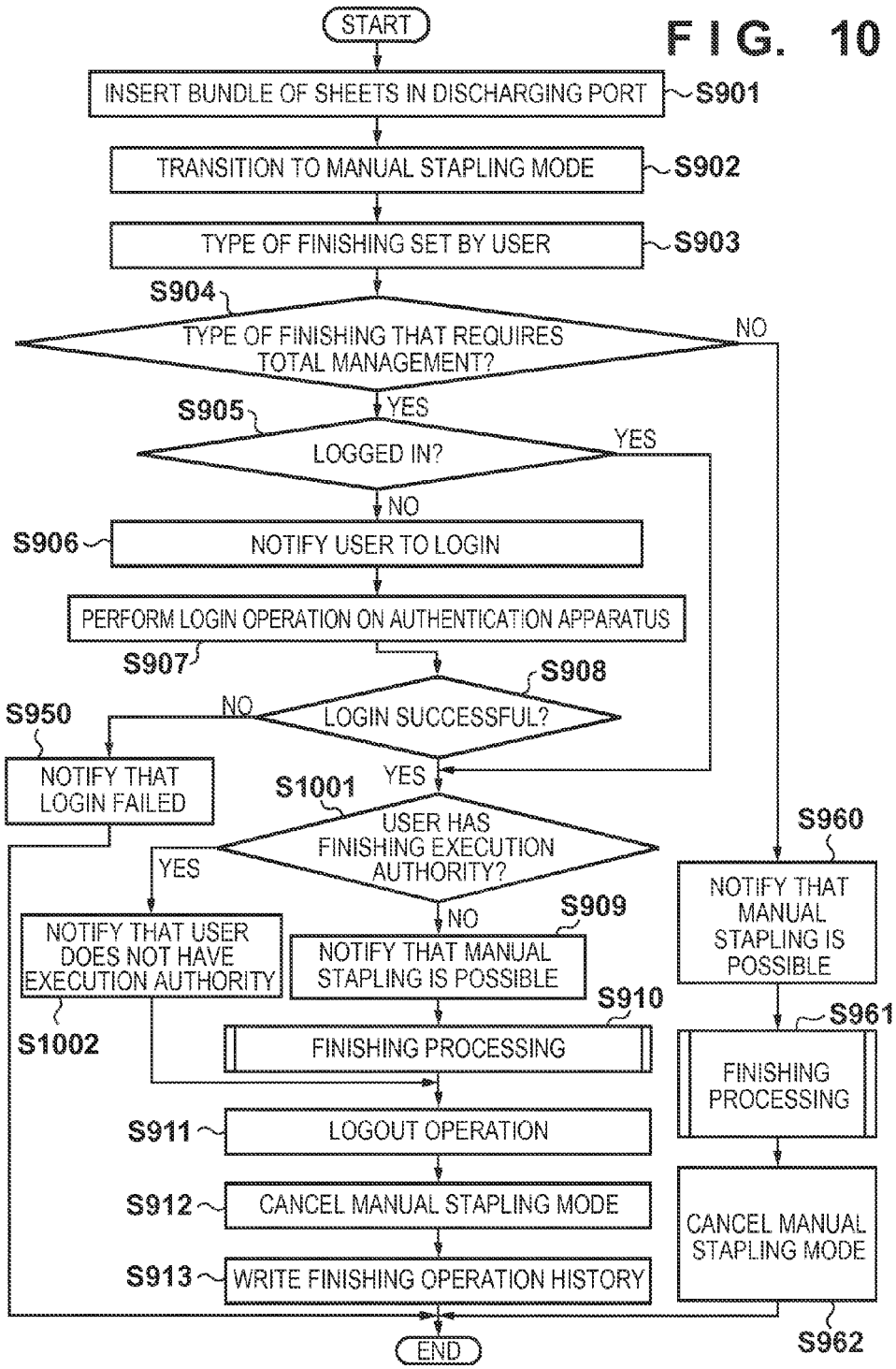
FIG. 10 is a flowchart according to a third embodiment.

Hereinafter, a third embodiment according to the present invention will be described, with reference to FIG. 10. Restriction determination as to whether the user has authority to execute finishing processing is further performed, in addition to the controls of the above embodiments. Here, only the processing added to the flowchart of FIG. 9 described in the second embodiment will be described. In FIG. 10, the same step numbers are given to processing that is the same as the flowchart of FIG. 9. That is, hereinafter, only S1001 and S1002 will be described.

In S1001, the controller unit 110 performs inquiry processing on user authority data recorded in the HDD 140, using the selected type of finishing processing and the authenticated user ID. Here, user authority data is data that is set in advance by the administrator and in which various functions of the image forming apparatus 100 whose use is permitted by user ID are registered. In the case where the authority inquiry of S1001 indicates that the finishing function of manual stapling selected by a logged-in user is permitted, the same manual stapling operation as the above second embodiment from S909 is performed. On the other hand, in the case where it is determined at S1001 that the finishing function is not permitted, the processing advances to S1002, and the controller unit 110 performs display on the operation unit 170 to notify the user that he or she does not have execution authority and is not able to execute the function, advances to S912 and executes logout processing, and ends the processing.

As described above, the image forming apparatus 100 according to the present embodiment is controlled as follows, in the case where post-processing is separately executed in the finisher unit 500, without an image forming operation (printing operation) being performed. The image forming apparatus 100 determines whether the user is permitted to execute the finishing processing that he or she has selected, based on the selected type of finishing processing and the user ID at the time of logging in. If permitted, the image forming apparatus 100 allows the post-processing to be executed and records an operation history. An operation history can thereby be left, even in the case where the finisher unit 500 is used separately. Also, in the present embodiment, execution of finishing processing can be restricted by user, using the execution histories recorded as a result of total management. For example, when the number of the staples consumed by a predetermined user exceeds a predetermined value, execution of finishing processing corresponding to that user can be restricted.

Other Embodiments

Note that in the above embodiments, an example was described in which user authentication is prompted if user authentication is required on condition that insertion of a bundle of sheets into the discharging port 510 is detected with the detection sensor 526. However, the present invention is not limited thereto. For example, in the case where one of the buttons 521 to S23 provided on the operation unit 520 is pressed, the processing from S702 of FIG. 7 may be executed, the processing from S902 of FIG. 9, or the processing from S1002 of FIG. 10 may be executed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126126 filed on Jun. 14, 2013, which is hereby incorporated by reference herein in its entirety.

What is claimed is:

1. A printing system, comprising:
   an authentication unit configured to obtain authentication information and execute authentication processing for authenticating a user based on the authentication information;
   a control unit configured to cause the user to log in to the printing system based on an authentication result of the authentication unit;
   an image forming unit configured to form an image on a sheet; and
   a binding unit for binding sheets with a staple, the binding unit being configured to be able to perform the binding for both sheets discharged from the image forming unit and sheets inserted to the binding unit by a user operation;
   wherein the control unit is further configured to determine whether or not the user is logging in to the printing system before the binding is performed to sheets inserted to the binding unit by the user operation, control to a display unit to display a message prompting the login in a case where any user does not log in to the printing system, and control the binding unit not to perform the binding before any user logs in to the printing system.

2. The printing apparatus according to claim 1, further comprising a memory unit configured to record history information including the authentication information obtained by the authentication unit after the binding unit performs the binding.

3. The printing apparatus according to claim 1, further comprising a detection unit for detecting a sheet inserted to the binding unit by the user operation,
   wherein the control unit performs the determination based on detected information output from the detection unit.

4. The printing apparatus according to claim 1, further comprising a second binding unit for binding sheets without a staple,
 wherein the control unit permits the second binding unit to perform the binding regardless of whether or not any user is logging in to the printing system when the binding is performed to sheets inserted to the second binding unit by the user operation.

5. The printing apparatus according to claim 1,
 wherein the authentication unit prompts a user to input a user ID.

6. A control method of a printing system, the method comprising:
 obtaining authentication information and executing authentication processing for authenticating a user based on the authentication information;
 causing the user to log in to the printing system based on an authentication result of the authentication unit;
 forming an image on a sheet; and
 binding, in a binding unit, sheets with a staple, the binding unit being configured to be able to perform the binding for both sheets discharged from the image forming unit and sheets inserted to the binding unit by a user operation, and
 wherein the casing step determines whether or not the user is logging in to the printing system before the binding is performed to sheets inserted to the binding unit by the user operation, controls to a display unit to display a message prompting the login in a case where any user does not log in to the printing system, and controls the binding unit not to perform the binding before any user logs in to the printing system.

7. A non-transitory computer-readable storage medium storing a computer program for causing a computer to execute the steps of the method of controlling a printing system, the method comprising:
 obtaining authentication information and executing authentication processing for authenticating a user based on the authentication information;
 causing the user to log in to the printing system based on an authentication result of the authentication unit;
 forming an image on a sheet; and
 binding, in a binding unit, sheets with a staple, the binding unit being configured to be able to perform the binding for both sheets discharged from the image forming unit and sheets inserted to the binding unit by a user operation,
 wherein the casing step determines whether or not the user is logging in to the printing system before the binding is performed to sheets inserted to the binding unit by the user operation, controls to a display unit to display a message prompting the login in a case where any user does not log in to the printing system, and controls the binding unit not to perform the binding before any user logs in to the printing system.

8. The printing apparatus according to claim 1, further comprising a key for instructing that the binding is performed to sheets inserted to the binding unit.

9. The printing apparatus according to claim 1, wherein the control unit permits the binding unit to perform the binding in a case where it is determined the user is logging in to the printing system.

10. The printing apparatus according to claim 2, wherein the history information is information indicating that the binding has been performed to sheets discharged from the image forming unit.

11. The printing apparatus according to claim 2, wherein the history information is information indicating that the binding has been performed to sheets inserted to the binding unit by a user operation.

* * * * *